G. F. FOGERTY.
Fluid-Discharging Apparatus.

No. 206,009. Patented July 16, 1878.

Witnesses.
W. J. Pratt.
Frederic Mills.

Inventor.
George F. Fogerty
by Crosby & Gregory, atty.

UNITED STATES PATENT OFFICE.

GEORGE F. FOGERTY, OF BOSTON, MASSACHUSETTS.

IMPROVEMENT IN FLUID-DISCHARGING APPARATUS.

Specification forming part of Letters Patent No. 206,009, dated July 16, 1878; application filed February 1, 1878.

*To all whom it may concern:*

Be it known that I, GEO. F. FOGERTY, of Boston, county of Suffolk, State of Massachusetts, have invented an Improvement in Fluid-Discharging Apparatus, of which the following is a specification:

This invention relates to mechanism for controlling the discharge of fluids from casks or barrels, pipes, or reservoirs.

The invention is an improvement on United States Letters Patent No. 198,286, granted to me December 18, 1877, to which reference may be had.

In this my present invention the bushing is provided with a perforated valve-seat, which receives a spindle having attached to it covering-arms, and a valve to bear upon opposite sides of the valve-seat. This same spindle, provided with lugs to be engaged by the tap part, also carries the strainer.

Figure 1:
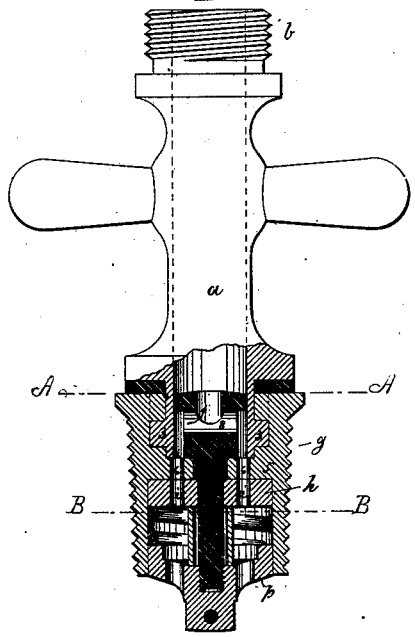
Figure 3:
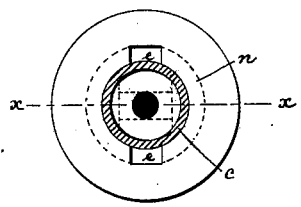
Figure 2:
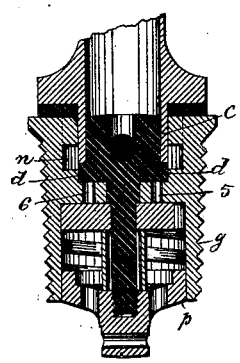
Figure 4:
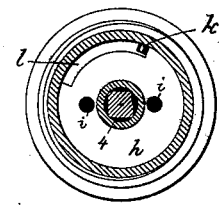
Figure 5:
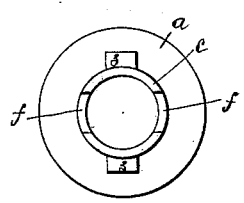
Figure 6:
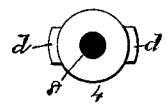

Figure 1 represents, in partial section, an apparatus embodying my invention with the parts in position to discharge fluid; Fig. 2, a similar section with the spindle turned so as to cause the arms and valves to cover the holes in the valve-seat; Fig. 3, a section on line A; Fig. 4, a section on line B, Fig. 1; Fig. 5, an inner end view of the tap part, and Fig. 6 the head of the spindle.

The tap part $a$, as shown in the drawing, is made hollow, for the passage through it of the fluid. A curved or other suitable shaped discharge nozzle or hose may be attached to the screw-threaded end $b$ of the tap part. This tap part has at its inner end a collar, $c$, to enter the circular opening between the spindle-head and bushing. Lugs 3 on the collar enter notches $e$, and the collar-notches $f$ embrace the covering-arms $d$, attached to the head of the spindle 4, extended through the valve-seat 5 of the bushing $g$. This spindle, after passing through the valve-seat, has applied to it a valve, $h$.

The spindle 4 is made square, but it may be of any other shape which will cause the valve, when placed on the spindle, to turn with it.

A stop-pin, $k$, attached to the interior of the bushing $g$, enters a cut-away portion, $l$, of the valve, and acts as a stop to permit this spindle to rotate far enough in each direction to close or to uncover the holes 6 in the valve-seat. When the tap part is withdrawn from the bushing the covering-arms $d$ of the spindle-head stand so as to cover the holes 6 in the valve-seat, or in the line $x\,x$, Fig. 3. Now, if the tap part is made to enter the bushing and surround the head of the spindle and is turned, the lugs 3 entered at the notches $e$ will, as the tap part is rotated, fall behind the front end of this bushing and move in the annular space $n$, so that the tap part cannot be drawn out. This partial rotation of the tap part rotates the spindle 4 with it, and moves the covering-arms $d$ away from the opening 6, and also moves the valve $h$, so that its openings $i$ register with the openings 6. In this position fluid below the strainer $p$, which is sustained by the spindle and moves with it, flows readily through the openings $i$ of the valve, the openings 6 of the valve-seat, and thereon through passage 8, as shown in Fig. 1, out through the tap part. The valve is held pressed upon its seat by a spiral spring, and by turning the strainer farther up on the spindle the wear of the valve may be compensated for.

The strainer may be attached to the spindle as is the valve, and a nut be placed upon the end of the spindle to hold the strainer, spring, and valve thereon.

When the tap $a$ is so turned as to permit the lugs 3 to be drawn out of the annular recess, such movement causes a solid portion of the valve and the arms $d$ to cover the holes 6 and effectually prevent the flow of the fluid.

This invention is specially applicable for drawing off beer and other liquids from casks and barrels, and, constructed on a large scale, is very effective as a hydrant, for the tap part will act as a key, and a hose-pipe may be attached at $b$. The spring as it forces the valve against the seat also acts to draw the arms $d$ toward the opposite side of the valve-seat.

I claim—

1. The bushing and valve-seat and valve, in combination with the spindle provided with the covering-arms, the valve turning with the spindle and the arms, and acting to cover and uncover the holes in the valve-seat, substantially as described.

2. The bushing and valve-seat and valve, in combination with the spindle provided with the covering-arms and a strainer supported by the spindle, substantially as described.

3. The bushing, valve-seat, and valve, in combination with the spindle, the covering-arms, and a coiled spring-packing arranged to press the valve and arms against opposite sides of the valve-seat, substantially as described.

4. The bushing, the valve-seat, and the loose spindle having arms to cover the openings 6, in combination with a valve and a stop to control the rotation of the spindle and valve, substantially as described.

5. The tap part and its collar, provided with lugs and notches to surround the head of the spindle and co-operate with the bushing and arms of the spindle, substantially as described.

6. The tap part provided with the collar and a lug and with a screw-threaded end, substantially as described.

In testimony whereof I have signed my name to this specification in the presence of two subscribing witnesses.

GEORGE F. FOGERTY.

Witnesses:
G. W. GREGORY,
W. J. PRATT.